United States Patent
Cohen et al.

(10) Patent No.: US 8,923,667 B2
(45) Date of Patent: Dec. 30, 2014

(54) WAVELENGTH SELECTIVE SWITCH WITH MULTIPLE INPUT/OUTPUT PORTS

(75) Inventors: Gil Cohen, Livingston, NJ (US); Yossi Corem, Beit Shemesh (IL); Roey Harel, New Providence, NJ (US); Johnny Leung, Oxford, CT (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/578,587

(22) PCT Filed: Feb. 11, 2011

(86) PCT No.: PCT/US2011/024616
§ 371 (c)(1),
(2), (4) Date: Oct. 19, 2012

(87) PCT Pub. No.: WO2011/100605
PCT Pub. Date: Aug. 18, 2011

(65) Prior Publication Data
US 2013/0028556 A1  Jan. 31, 2013

Related U.S. Application Data

(60) Provisional application No. 61/282,438, filed on Feb. 12, 2010.

(51) Int. Cl.
*G02B 6/42* (2006.01)
*G02B 6/35* (2006.01)
*H04J 14/02* (2006.01)

(52) U.S. Cl.
CPC ........... *G02B 6/351* (2013.01); *G02B 6/353* (2013.01); *G02B 6/356* (2013.01); *H04J 14/0212* (2013.01)
USPC ............................................. 385/16; 398/83

(58) Field of Classification Search
USPC ............................ 385/16, 14, 18, 17; 398/83
See application file for complete search history.

(56) References Cited

U.S. PATENT DOCUMENTS 7,454,100 B2  11/2008  Corem et al.
7,468,840 B2  12/2008  Cohen et al.

(Continued)

FOREIGN PATENT DOCUMENTS

WO  WO 2007/029260 A2  3/2007

OTHER PUBLICATIONS

Lopez et al., MEMS mirror array for a wavelength-selective 1xK switch, Smart Sensors, Actuators, and MEMS. Proceedings of the SPIE, vol. 5116, pp. 445-455 (2003).*

(Continued)

*Primary Examiner* — Peter Radkowski
(74) *Attorney, Agent, or Firm* — Kurt Rauschenbach; Rauschenbach Patent Law Group, LLC (57) ABSTRACT

A multi-port wavelength selective switch includes a one dimensional array of input and output ports. The multi-port wavelength selective switch further includes a wavelength dispersive element configured to receive input optical signals from the input ports, and to disperse wavelength components thereof. Additionally, the multi-port wavelength selective switch includes an array of beam steering devices. Each beam steering device is controllable to a position at which the beam steering device directs a wavelength component of an input optical signal received through a first input port to an output port and directs the same wavelength component of an input optical signal received through a second input port away from all of the output ports.

15 Claims, 4 Drawing Sheets

(56) References Cited

U.S. PATENT DOCUMENTS

| | | |
|---|---|---|
| 7,558,447 B2 | 7/2009 | Suh et al. |
| 7,636,503 B2 | 12/2009 | Yamamoto et al. |
| 2002/0071627 A1* | 6/2002 | Smith et al. ............... 385/15 |
| 2005/0213879 A1* | 9/2005 | Wang et al. ............... 385/24 |
| 2006/0198583 A1* | 9/2006 | Oikawa et al. ............ 385/53 |
| 2007/0041683 A1 | 2/2007 | Keyworth |
| 2008/0218680 A1 | 9/2008 | Yuan et al. |
| 2008/0316585 A1 | 12/2008 | Cohen et al. |
| 2009/0028502 A1* | 1/2009 | Presley et al. ............. 385/18 |
| 2009/0232446 A1* | 9/2009 | Nagy et al. ............... 385/18 |
| 2010/0172646 A1* | 7/2010 | Colbourne ................ 398/49 |
| 2010/0202778 A1* | 8/2010 | Wisseman ................. 398/83 |
| 2010/0272441 A1* | 10/2010 | Boduch et al. ............ 398/83 |

OTHER PUBLICATIONS

International search report and written opinion for application No. PCT/US2011/024616 dated Apr. 6, 2011.

* cited by examiner

WAVELENGTH SELECTIVE SWITCH WITH MULTIPLE INPUT/OUTPUT PORTS

FIELD OF THE INVENTION

The present invention relates to the field of fast optical switches, whose operation is wavelength dependent, especially those having more than one input port and more than one output port simultaneously.

BACKGROUND OF THE INVENTION

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system.

There is a need in such systems to selectively switch various optical wavelength signals passing along one fiber to any of a number of other fibers. Such a switch is known as an optical router. A number of wavelength dependent switches and routers exist in the prior art. In U.S. Pat. Nos. 7,468,840, 7,558,447, 7,454,100 and U.S. Patent Application publication No. 2008/0316585, all hereby incorporated by reference, each in its entirety, there are disclosed various wavelength selective switches and routers, wherein an input optical signal undergoes spatial wavelength dispersion and polarization splitting in two different planes, which can conveniently be perpendicular planes. The wavelength dispersion may preferably be performed by a diffraction grating and the polarization-splitting by a polarized beam splitter. A polarization rotation device, such as a liquid crystal polarization modulator, pixelated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar or the same dispersion and polarization combining components as were used to respectively disperse and split the input signals. At the output polarization recombiner, the direction in which the resulting output signal is directed is determined by whether the polarization of the particular wavelength channel was rotated by the polarization modulator pixel, or not.

In US Patent Application publication No. 2008/0316585, there is described a multi-port switchable router, using beam steering elements which can be either an array of Micro-Electro-Mechanical System (MEMS) components, such as micro-mirrors, or a set of serially disposed liquid crystal arrays and wedge shaped birefringent crystals, which generate different angles of propagation to the beam passing therethrough according to the different polarizations of the beams produced by the setting of the liquid crystal array pixels, or a liquid crystal-on-silicon (LCOS) spatial light modulator acting as a phased array. Such routers can be conveniently constructed having 10 ports or more, and can be generally configured as a 1×9, or a 9×1 unit. In order to reduce the angular deviation required of the beam switching element, it is common to have the input port at the center of the port array, such that the element need only move one half the total port span, but in each direction.

The disclosures of each of the publications mentioned in this section and in other sections of the specification, are hereby incorporated by reference, each in its entirety.

SUMMARY OF THE INVENTION

There exist situations in optical network switching when it would be desirable to have a router having 2 input ports and multiple output ports rather than the usual 1 input port and multiple output ports. There exist equivalent situations when it would be desirable to have a router having multiple input ports and 2 output ports instead of the usual 1 output port. In general, by the reciprocity principle, any implementation of a router for the former of these needs will also be suitable for the later, and vice versa. Consequently, throughout this application, when, for instance, a 2×n router is discussed, described or claimed, it is to be understood that the discussion, description or claim is also intended to cover an n×2 router.

The router should advantageously have a footprint no different from a router having a similar total number of ports with only a single input port. A currently available 1×n router, using a one-dimensional MEMS for the beam steering and a one-dimensional fiber array for the input/output ports, as described hereinabove in the background section of this application, could be converted for 2×(n−1) use, by using the 2 center fibers in the array as input ports and the rest as the (n−1) output ports. However, such a configuration could generate a problem in that, for any given tilt angle of a MEMS mirror, the optical signal from one input port will be coupled to a given output port, while at the same time, the optical signal from the second input port will be coupled to a different output port. There exists ambiguity of paths between input and output ports. Thus for any nominal angle of steering, the input signals to two ports disposed at randomly selected positions of the input array, could both be connected to the outputs determined by the angle of the steering mirror. However, such a configuration would be unacceptable for use in an optical communication network, since it could force a given optical signal from one input port to couple to an undesired output port. Therefore, a method must be found whereby the router has a single valued transfer function for any given wavelength, and is prevented from providing switching paths for an input signal having the same wavelength for both of the 2 input ports simultaneously. If such like-wavelength signals are presented to the 2 input ports, the switch configuration must be such that one of them is blocked inside the router.

This is achieved in the exemplary switches described in this disclosure by configuring the input ports to be at the extremities of the input/output fiber array. Therefore, for any given angular position of the steering element, selected to divert the beam from one of the input ports to its selected output port, an input of the same wavelength to the second input port at the far extremity of the array will be directed by the steering element to a position even further out of the array limits, and the second input beam will not be coupled to any output port, and will be lost. A beam of a different wavelength input to the second input port at the far extremity of the array, will be dispersed by the wavelength dispersion element in the router switch to a different steering element, which could be at any angular position, different to that of the steering element associated with the first wavelength, and which therefore would be able to switch the second wavelength beam to any desired output port.

By this means, for any pair of signals input to the router, if they have different wavelengths, they can both be switched to any output ports as selected by the switching needs of the network. On the other hand, if they have the same wavelength and one of them is switched to its desired destination output port, the switch configuration of this disclosure will ensure that the other will be blocked from transmission through the switch.

BRIEF DESCRIPTION OF THE DRAWINGS

The present invention will be understood and appreciated more fully from the following detailed description, taken in conjunction with the drawings in which.

DETAILED DESCRIPTION

Figures 1A, 1B:
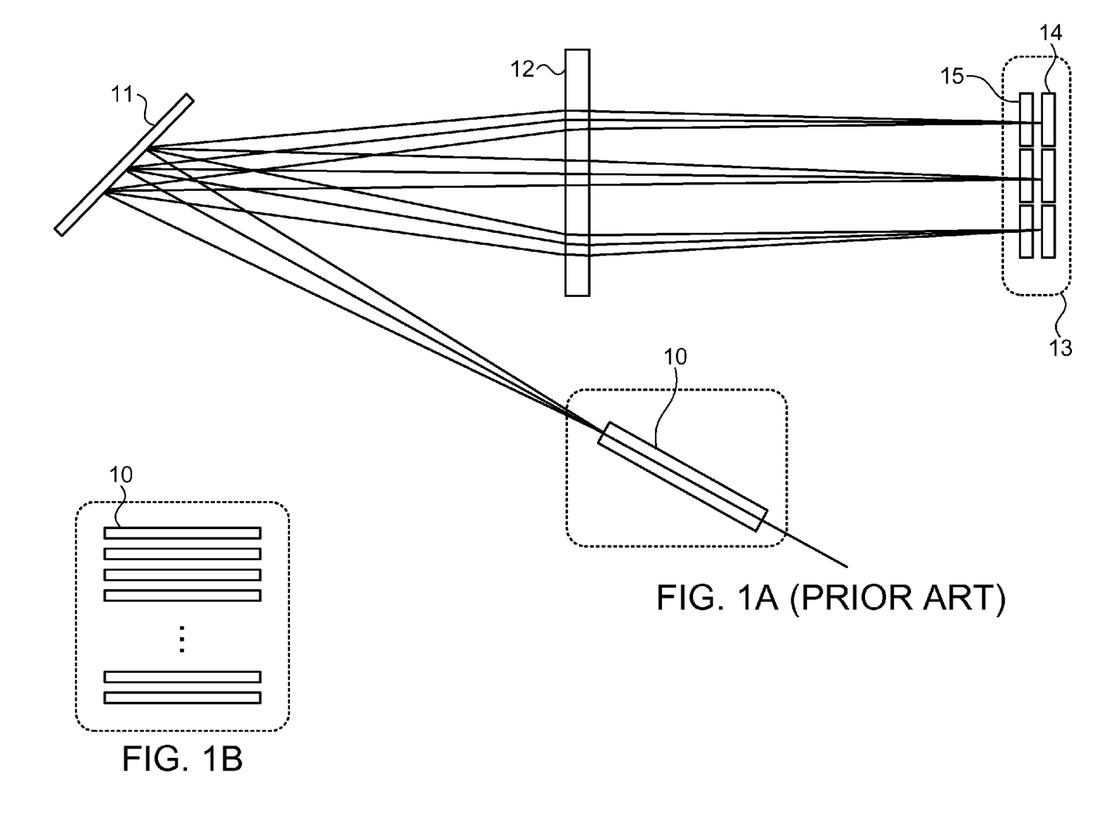
FIGS. 1A and 1B illustrate schematically a prior art wavelength selective switch structure (WSS)

Reference is now made to FIG. 1A, which illustrates schematically a top view of a prior art wavelength selective switch structure (WSS), such as is described in International Patent Application No. PCT/IL2006/001052, and as used for channel routing applications in optical communication and information transmission systems. The WSS includes a stack 10 of fiber collimators for inputting and outputting the optical signals. Only one is visible since in FIG. 1A, the stack is being viewed from the top. In this application, and as is conventionally used in the art, the dispersion plane of the switch is generally called the lateral plane, such that the view in the dispersion plane is called the side view, while the view perpendicular to the dispersion plane is called the plan view or the view from the top. The drawing insert, FIG. 1B, shows a side view of the stack 10 of fiber collimators. The beam issuing from each fiber collimator is converted into a pair of closely disposed beams having the same predefined polarization direction for transmission through the WSS. This may be achieved by the use of a birefringent walk-off crystal, such as a $YVO_4$ crystal, having a halfwave plate over part of its output face. The output of each input collimator channel is thus converted into a pair of beams having the same polarization direction, disposed in a predetermined plane. After this polarization decomposition and conversion, these beams can then advantageously be laterally expanded in that same predetermined plane, such as by an anamorphic prism pair. These polarization conversion and beam expansion components, being well known in the art, are not shown in FIG. 1A.

These input beams are wavelength dispersed in the plane of the drawing, conveniently by means of a diffraction grating 11. The wavelength dispersed beams are focused by a lens 12 onto a one-dimensional beam steering and switching array 13. In the exemplary switch shown in FIG. 1A, a MEMS array 14 is used for the beam steering, and a pixilated liquid crystal cell 15 for attenuation of the switched beams. For the sake of simplicity, only 3 separate wavelength channels and three pixels are shown in FIG. 1, though it is to be understood that using a channel spacing of 100 GHz or even 50 GHz, the number of channels that will fit into the bandwidth of the device will be much larger than that. The MEMS array steers the signals destined for different output ports in a direction out of the plane of the drawing, such that output signals are differently directed to enter different fiber optical collimators 10 shown in the side view FIG. 1A, of the collimator stack.

Figure 2:
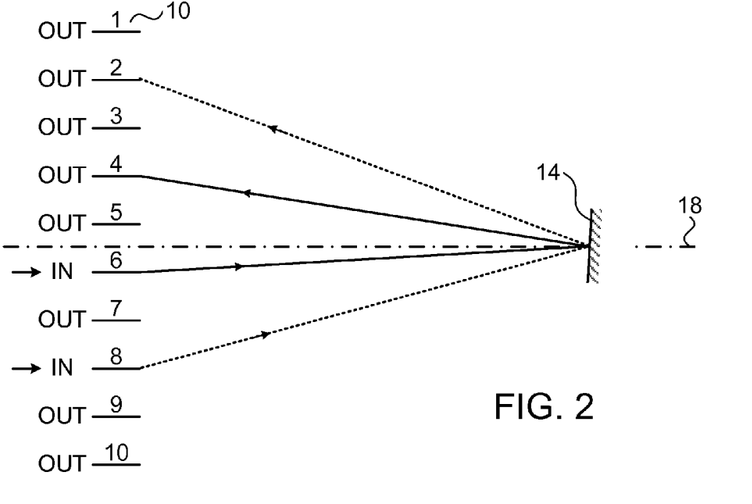
FIG. 2 illustrates schematically a side view of the collimator or fiber array input/output port configuration of a 10 port wavelength selective switch structure (WSS) of the type shown in FIGS. 1A, 1B, but with two input ports.

Reference is now made to FIG. 2, which illustrates schematically, a side view of the fiber array input/output port configuration of such a 10 port wavelength selective switch structure (WSS), showing two of the ports configured as input ports, and the rest as output ports. FIG. 2 shows only the fiber/collimator array 10 and the MEMS beam steering element 14 for a single wavelength, though it is to be understood that the switch also includes at least a wavelength dispersion element and that each wavelength pixel also has its attenuation/switching element. In the example shown, ports 6 and 8 are used as the input ports, representing any arbitrary selected input ports in the 10 port array, though in general, the input port or ports are selected near the centre axis 18 of the router, so that the angle of deviation required from the MEMS array is minimized. The input from port 6 is steered by the MEMS mirror 14 such that it is reflected for output from the switch at port 4. However the angle of the MEMS mirror 14 is such that the input from the second input port 8 at the same wavelength, (since both of these beam paths are steered by the same single element 14 of the beam steering array) is also reflected out of the switch assembly through port 2. Thus in the router example shown in FIG. 2, with the input ports arbitrarily selected, there can exist 2 input ports, each simultaneously switching to a different output port, input signals having the same wavelength. This may not be an acceptable condition, or may even be a forbidden configuration for such a multi-wavelength router.

Figure 3:
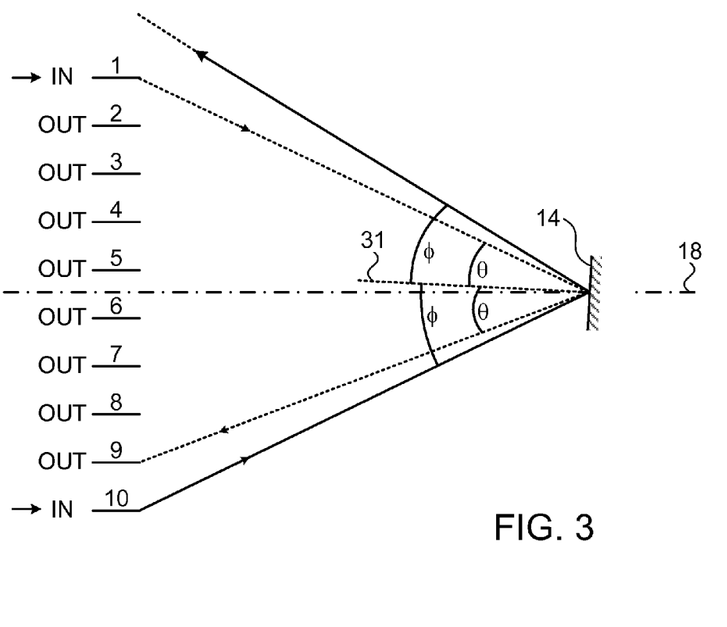
FIG. 3 illustrates schematically a side view of part of an example of a novel configuration of multi-port wavelength selective switch structure, having two input ports located at the extremities of the input port array.

Reference is now made to FIG. 3 which illustrates schematically a side view of the fiber array input/output port configuration of an exemplary 10-port wavelength selective switch structure 30, which overcomes this problem. The port array is configured such that the two designated input ports are disposed at the outer extremities of the array. Of the two input ports used in such a router, only one can provide a transmission path through the router for a single wavelength, while the optical path at the same wavelength from the other input port is blocked from outputting the router.

In the example router shown in FIG. 3, ports 1 and 10 are designated as the input ports and ports 2 to 9 are the output ports. When the beam steering MEMS mirror 14 is aligned closest to the position of normal incidence to the input beam on port 1, that beam will be reflected back to port 2. As the beam steering mirror is rotated, in an anticlockwise direction in the example shown in FIG. 3, the beam is reflected sequentially to ports 3, 4, . . . 7, 8, and finally to port 9, which is assumed to be the utilized limit of motion of the beam steering mirror. At this position, the mirror is closest to being normal to the center line 18 of the router, and the input beam from port 1, making an angle of incidence θ with the normal 31 of the mirror, is reflected back to port 9, also at an angle θ with the normal 31 of the mirror. In this position, if a second beam of the same wavelength is now input to port 10, making an angle of incidence φ to the normal 31 of the mirror, geometrical optics considerations will ensure that it is reflected at an angle φ to the normal of the mirror, to a position beyond the other extremity of the input/output port array, i.e. beyond port 1, since φ>θ. It will thus be absorbed within the router and not transmitted out of any port. At any other allowed angular position of the mirror 14, an input beam to port 10 will impact the mirror at an even larger angle of incidence than φ, and will thus be reflected even further out from the other extremity of the input/output port array. By this means, the router configuration only allows a single input signal of a given wavelength to be output from the router.

FIG. 3 shows the implementation of the present invention as a 2×8 switching configuration. However, if the same configuration is to be used as an 8×2 switch, there will be need for isolators on the 8 input ports, to prevent output of geometrically allowed optical paths to those input ports.

Figure 4:
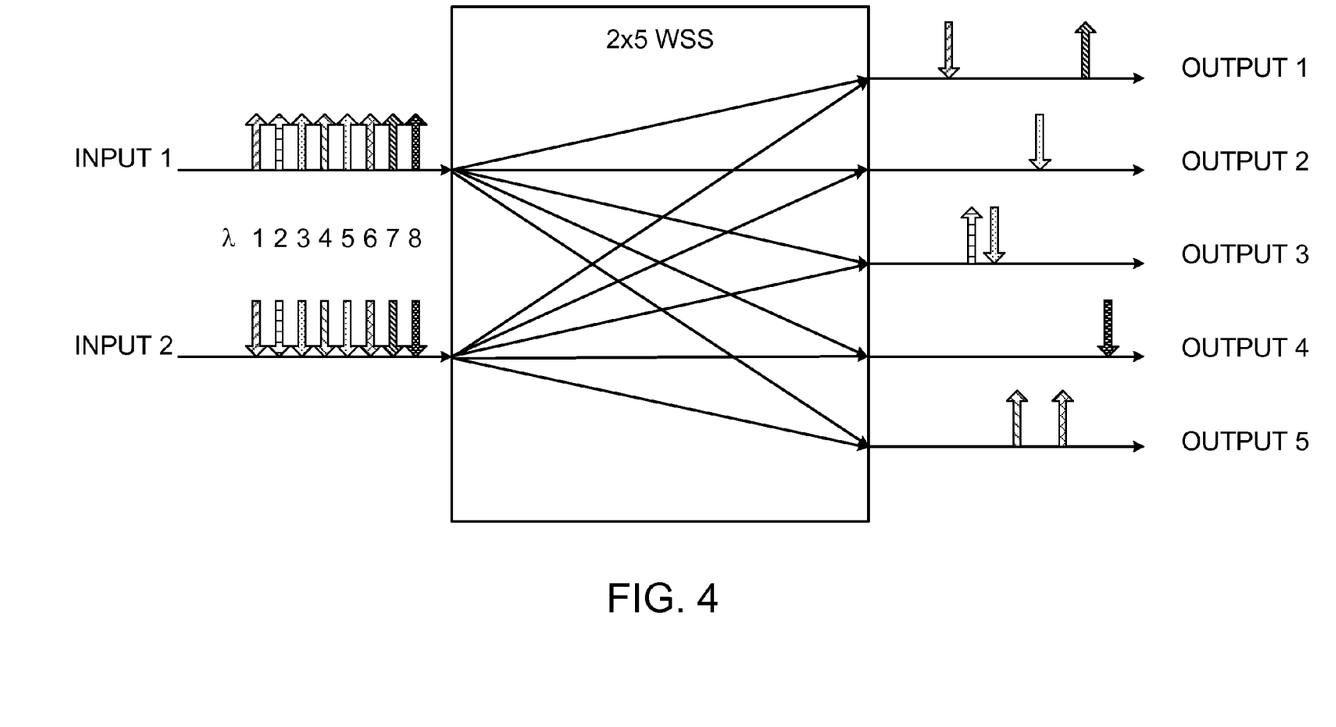
FIG. 4 illustrates schematically the functionality of a 2×5 WSS, constructed using the methods described in the present disclosure.

References now made to FIG. 4, which illustrates schematically the functionality of a 2×5 WSS, constructed according to the methods described in the present disclosure. The input signals to each of the two input ports are showing schematically in FIG. 4 as being composed of any one of eight different wavelengths, labeled $\lambda 1$ to $\lambda 8$, each wavelength being depicted by a different type of shading on the representation of the signal. In order to distinguish between the signals input to port 1 and those to port 2, they are designated in FIG. 4 by nominally different forms, with the direction of the arrow heads indicating the source input port, though it is to be understood that in practice, the signals are identical. Any one of the eight wavelengths can be applied to any one of the two input ports. However using the novel switch architecture described in this disclosure, the different wavelengths will be directed to the desired output ports according to the switching commands for each packet of information, but none of the five output ports can have directed to them a signal having the same wavelength from both of the two input ports. Thus in FIG. 4, although all of the wavelengths 1 to 8 are input to both input ports, only one of the two same wavelength inputs can be output from the output ports, as shown on the right hand side of the switch. The switch configuration determines which of the two like-wavelength inputs is output. FIG. 4 is only a functional representation, with the input ports shown on the left-hand side of the switch, and the output ports on the right-hand side of the switch, in order to clearly show the switching functionality. In practice, a reflective switch of this type will have all the ports, both input and output, linearly aligned on one side, as shown in FIG. 3 above.

The cost of a MEMS device is strongly dependent on the total deviation angle demanded of the MEMS. Consequently, if the same type of MEMS as is used for a prior art 1×9 WSS is to be used for a 2×n WSS of the present application, the number of output ports will be limited to 5. This arises from the positioning of the input port of the prior art 1×9 WSS on or close to the optical axis of the WSS, such that the MEMS need only divert the input beam by a maximum of five port intervals from its zero position with no applied drive voltage. Using the same MEMS array in a 2×n WSS, the five port intervals will be only able to cover five output ports. In order to cover a total of 10 ports, i.e. a 2×8 WSS, a MEMS array with a larger angular deviation will be required.

Figure 5:
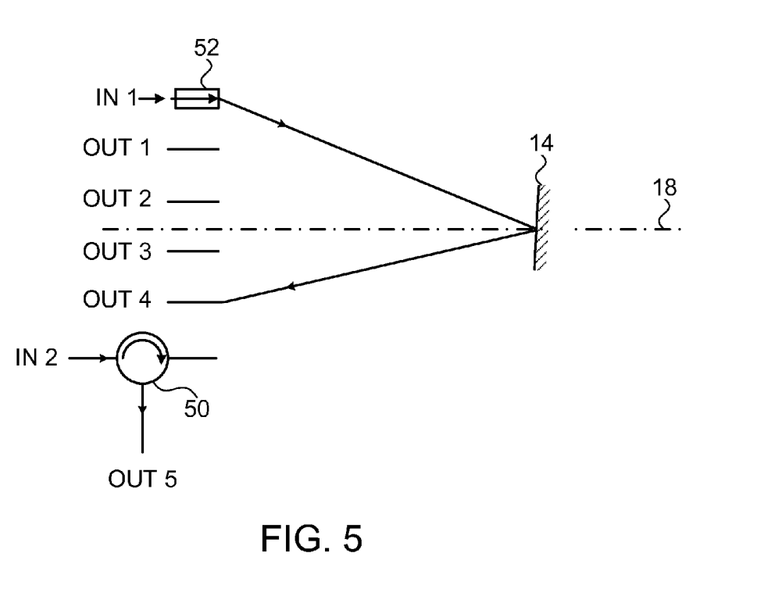
FIG. 5 illustrates schematically a further exemplary implementation of the routers of the present application, in which a circulator is used in order to reduce the angular deviation demanded of the MEMS.

Reference is now made to FIG. 5, which illustrates schematically a further exemplary implementation of the routers of the present application, in which a circulator 50 is used in order to reduce the angular deviation demanded of the MEMS 14 even further. A 2×5 router is shown as an example of this implementation. According to the previously described implementation of FIG. 4, a total of 5 incremental angular steps is required of the MEMS to cover transmission to all 5 output ports. In the implementation of FIG. 5, use of a circulator 50 can reduce the deviation required by one incremental step. The circulator is functional to receive the second input signal and to output the last output signal. According to this implementation, a total of only 4 incremental angular steps is required of the MEMS to cover transmission to all 5 output ports, since the last port of the linear array acts as both the second input and the fifth output. For this configuration, an isolator 52 will be needed on input port number 1, since when the mirror is aligned to switch a signal from input 1 to output 5, a signal on input 5 would be switched to input 1. The isolator on input 1 blocks this forbidden path.

Figure 6:
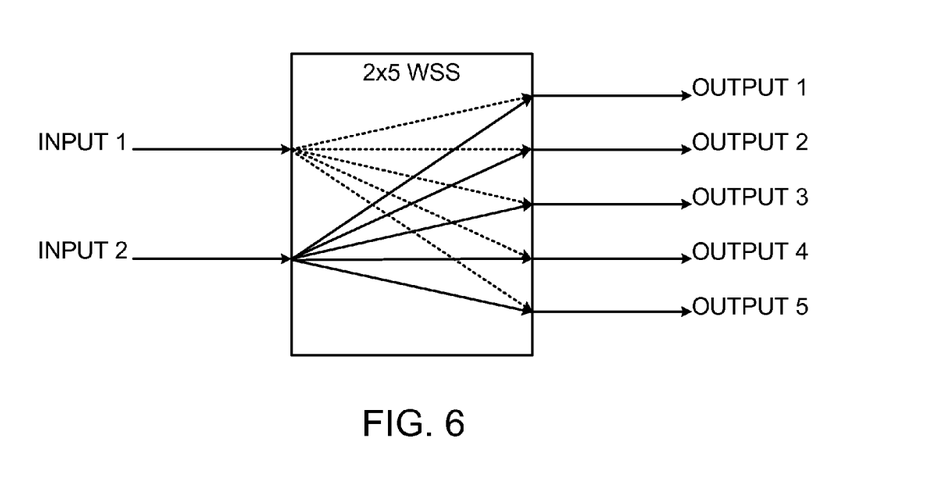
FIG. 6 illustrates schematically a wavelength protected 2×5 router for use in an ROADM, providing link redundancy without the need for doubling the number of switches required.

Reference is now made to FIG. 6, which illustrates schematically one exemplary practical application of the 2×n routers of the present disclosure. FIG. 6 shows a wavelength protected 2×5 router for use in an ROADM, providing link redundancy without the need for doubling the number of switches required. A pair of fibers is input to inputs 1 and 2 of the WSS. Because of the single valued transmission path through the switch for each wavelength, the redundant signals from only one of the input fibers are transmitted through the switch to their appropriate output ports. Supposing that for example, the optical information is being carried on the line connected to input port 1, and a fault now occurs on that line, as shown in FIG. 6, such that the input signal on port 1 is lost. The network monitor detects the sudden absence of an input signal, and switches the transmission to the parallel fiber, now inputting the signal to input port 2. The WSS will now switch the same wavelength from input port 2 to output port 2, this alternative path being the redundancy protection channel. Thus the switching and transmission function of the network continue undisturbed, and without the need for providing a second redundant switch for use in such emergencies. If the switch is part of an ROADM module, a similar 5×2 WSS would be required at the other end of the ROADM for the DROP configuration.

It is appreciated by persons skilled in the art that the present invention is not limited by what has been particularly shown and described hereinabove. Rather the scope of the present invention includes both combinations and sub combinations of various features described hereinabove as well as variations and modifications thereto which would occur to a person of skill in the art upon reading the above description and which are not in the prior art.

The invention claimed is:

1. A multi-port wavelength selective switch comprising:
   a) a one-dimensional array of input and output ports;
   b) a wavelength dispersive element configured to receive input optical signals from the input ports, and to disperse wavelength components thereof; and
   c) an array of beam steering devices, at least one of which is controllable to direct a first dispersed wavelength component, received through a first input port disposed at an outer extremity of the array of input and output ports, to an output port and directs a second dispersed wavelength component of the same wavelength as the first dispersed wavelength component, received through a second input port disposed at the outer extremity of the array of input and output ports, to a position away from all of the output ports.

2. The switch according to claim 1, further comprising an optical attenuating array configured to control the attenuation of the wavelength components of the input optical signals.

3. The switch according to claim 1, wherein the array of beam steering devices comprises a MEMS mirror array.

4. The switch according to claim 1, wherein the array of beam steering devices comprises a liquid crystal array.

5. The switch according to claim 1, further comprising a circulator at one of the first and second input ports, such that the input port is operative as an input port and an output port.

6. The switch according to claim 1, further comprising a lens configured to focus the wavelength components onto the array of beam steering devices.

7. The switch according to claim 1, wherein the wavelength dispersive element is diffraction grating.

8. A method of switching selected wavelength components of a multi-wavelength input optical signal to a desired output port, the method comprising:
   a) receiving a first input optical signal and a second input optical signal;
   b) dispersing the first and second input optical signals into wavelength components thereof; and
   c) controlling an array of beam steering devices such that one of the beam steering devices directs a first dispersed wavelength component of the first input optical signal, received through a first input port disposed at an outer extremity of an array of input and output ports, to an output parts port and concurrently directs a second dispersed wavelength component having the same wavelength as the first dispersed wavelength component of the second input optical signal, received through a second input port disposed at the outer extremity of the array of input and output ports, away from all of the ports.

9. The method according to claim 8, further comprising attenuating the wavelength components of the first and second input optical signals.

10. The switch according to claim 1, further comprising a network monitor for monitoring the wavelength components of the first and/or second input optical signals.

11. The switch according to claim 10, wherein the first and/or second input optical signals are redundant signals.

12. The switch according to claim 11, wherein the array of beam steering devices directs the same wavelength component of the second input to the output port when the network monitor detects a loss of signal on the first input.

13. The method according to claim 8, further comprising monitoring the wavelength components of the first and/or second input optical signals.

14. The method according to claim 13, wherein the first and/or second input optical signals are redundant signals.

15. The method according to claim 14, wherein one redundant signal is routed to the output port when the monitoring the wavelength components of the first and/or second input optical signals detects the absence of another redundant signal.

\* \* \* \* \*

UNITED STATES PATENT AND TRADEMARK OFFICE
CERTIFICATE OF CORRECTION

PATENT NO.         : 8,923,667 B2                                        Page 1 of 1
APPLICATION NO.    : 13/578587
DATED              : December 30, 2014
INVENTOR(S)        : Cohen et al.

It is certified that error appears in the above-identified patent and that said Letters Patent is hereby corrected as shown below:

In the Claims

Please correct as follows:

Claim 8 (col. 7, line 22)

--reads ...output parts port and concurrently directs a second...

--should read --output port and concurrently directs a second...

Signed and Sealed this
Ninth Day of June, 2015

Michelle K. Lee
*Director of the United States Patent and Trademark Office*